United States Patent [19]

Middleton

[11] Patent Number: 4,518,040

[45] Date of Patent: May 21, 1985

[54] METHOD OF FRACTURING A SUBTERRANEAN FORMATION

[75] Inventor: James D. Middleton, Lawton, Okla.

[73] Assignee: Halliburton Company, Duncan, Okla.

[21] Appl. No.: 509,255

[22] Filed: Jun. 29, 1983

[51] Int. Cl.$^3$ .................... E21B 43/26; E21B 43/27
[52] U.S. Cl. .................................... 166/307; 166/308
[58] Field of Search ............ 166/300, 307, 308, 270, 166/271, 280, 281, 305 R; 252/8.55 C

[56] References Cited

U.S. PATENT DOCUMENTS

| | | |
|---|---|---|
| 1,990,969 | 2/1935 | Wilson . |
| 3,157,232 | 11/1964 | Ramos et al. . |
| 3,307,630 | 3/1967 | Dilgren et al. . |
| 3,707,192 | 12/1972 | Goins, Jr. et al. . |
| 3,727,691 | 4/1973 | Muecke et al. . |
| 3,828,854 | 8/1974 | Templeton et al. . |
| 3,868,996 | 3/1975 | Lybarger et al. . |
| 3,889,753 | 6/1975 | Richardson . |
| 3,948,324 | 4/1976 | Lybarger . |
| 3,953,340 | 4/1976 | Templeton et al. . |
| 4,007,789 | 2/1977 | Clampitt . |
| 4,056,146 | 11/1977 | Hall . |
| 4,079,011 | 3/1978 | Tate . |
| 4,090,563 | 5/1978 | Lybarger et al. . |
| 4,136,739 | 1/1979 | Salathiel et al. . |
| 4,148,360 | 4/1979 | Watanabe . |
| 4,151,878 | 5/1979 | Thomas . |
| 4,151,879 | 5/1979 | Thomas . |
| 4,160,483 | 7/1979 | Thomas et al. . |
| 4,200,154 | 4/1980 | Tate . |
| 4,203,492 | 5/1980 | Watanabe . |
| 4,237,975 | 12/1980 | Scherubel . |
| 4,244,826 | 1/1981 | Swanson . |
| 4,261,421 | 4/1981 | Watanabe . |
| 4,267,887 | 5/1981 | Watanabe . |
| 4,332,688 | 6/1982 | Tate . |

*Primary Examiner*—Stephen J. Novosad
*Assistant Examiner*—Bruce M. Kisliuk
*Attorney, Agent, or Firm*—Thomas R. Weaver; Edward F. Sherer

[57] ABSTRACT

A method for fracturing a subterranean formation whereby undesirable fines are removed from the fracture face and/or proppant pack. The method is carried out by introducing hydrogen ions and fluoride ions into the formation being fractured and allowing hydrofluoric acid to be formed which dissolves the undesirable fines.

20 Claims, No Drawings

4,518,040

METHOD OF FRACTURING A SUBTERRANEAN FORMATION

BACKGROUND OF THE INVENTION

A. Field of the Invention

This invention relates to a method of treating a subterranean formation containing sandstone and clay components and penetrated by a well bore and more specifically, it pertains to a method of fracturing such a formation with an acid to effect an increase in permeability of the formation.

B. Description of the Prior Art

Acid treating or acidizing of porous subterranean formations penetrated by a well bore has been widely employed for increasing the production of fluids, e.g., crude oil, natural gas, etc., from said formations. The usual technique of acidizing a formation comprises introducing a non-oxidizing acid into the well under sufficient pressure to force the acid out into the formation where it reacts with the acidsoluble components of the formation. Hydrofluoric acid or a mixture of hydrofluoric acid and hydrochloric acid, commonly known as "mud acid" is typically employed to dissolve silica and clay.

During the acid treating operation, passageways for fluid flow are created in the formation, or existing passageways therein are enlarged, thus stimulating the production of fluids from the formation. This action of the acid on the formation is often called etching. Acid treating or acidizing operations wherein the acid is injected into the formation at a pressure or rate insufficient to create cracks or fractures in the formation is usually referred to as matrix-acidizing.

Hydraulic fracturing is also commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates the flow of fluids through the formation and into the well. Combination fracture-acidizing processes are well known in the art.

In a typical fracturing treatment, a particulate propping agent, e.g., sand, glass beads, sintered bauxite, nut shells, zirconia, alumina, and the like, is placed in the fracture to keep the fracture at least partially propped open.

It is well known that hydrofluoric acid rapidly dissolves silica, clay, and mixtures of silica and clay. For example, see U.S. Pat. No. 4,056,146 which is assigned to the assignee of the present invention and is herein incorporated by reference. This knowledge has been utilized in the acidizing of subterranean formations containing silica and clay to increase the permeability of such formations whereby the ability of fluids, such as oil, gas, and water to flow through the thus treated formations is enhanced.

One of the problems commonly encountered in a fracturing process is that the proppant pack or fracture face is frequently less permeable than it might be due to the presence of fines dispersed in the proppant pack or fracture face. The term "fines" as used herein shall include siliceous fines, clay platelets, and other similar fines. For purposes of this invention, clay is a hydrated aluminum silicate. The presence of these fines results in less than optimum fracture conductivity. The fines may be initially present in the proppant or fracture face, or may result from the migration of fines from the formation into the proppant pack or fracture face. Regardless of the source of the fines, and regardless of whether the fines are located in the proppant pack or in the fracture face, it is desirable during a fracturing operation to increase the fracture conductivity by removing the fines from the proppant pack and/or fracture face of the formation.

SUMMARY OF THE INVENTION

The present invention is a method for increasing the production of fluids from a subterranean formation wherein undesirable fines are removed from the proppant pack and/or fracture face. The method is carried out by fracturing the formation and the fracturing of the formation results in a propped fracture without undesirable fines in the proppant pack or fracture face of the formation.

In one aspect of the invention, a nonviscous aqueous fluid containing hydrogen ions is introduced into a subterranean formation at sufficient pressure to initiate a fracture in the formation and to leak off into the formation matrix, next a viscous aqueous fluid comprising a gelling agent and fluoride ions is introduced into the formation at sufficient pressure to extend the fracture and subsequently alternate slugs of a viscous aqueous fluid containing a gelling agent and a propping agent are introduced into the formation to maintain the fracture and to prop the fracture open after the treating pressure on the formation has been reduced. The first proppant laden viscous slug contains hydrogen ions and the second proppant laden viscous slug contains fluoride ions. Hydrofluoric acid is produced when the hydrogen ions and fluoride ions contact one another. The pressure within the formation can be reduced naturally or the pressure can be bled off on the surface. The resulting fracturing treatment results in a formation with increased permeability without undesirable fines in the proppant bed and/or face of the fracture.

In another aspect of the invention, a nonviscous aqueous fluid containing fluoride ions is introduced into the subterranean formation at sufficient pressure to initiate a fracture in the formation and to leak off into the formation matrix. Next, a viscous aqueous fluid containing a gelling agent and hydrogen ions, is introduced into the formation at a pressure sufficient to extend the fracture and finally a viscous aqueous fluid containing a gelling agent, hydrogen ions, and a propping agent is introduced into the formation to extend the fracture and to prop the fracture open after the treating pressure on the formation is reduced. The fluid containing the fluoride ions is allowed to flow from the formation matrix into the fracture and hydrofluoric acid is produced when the hydrogen ions and fluoride ions contact one another. The pressure of the formation can be reduced naturally or the pressure can be bled off on the surface. The use of this method results in a formation with increased permeability without undesirable fines in the proppant bed or fracture face of the formation.

DESCRIPTION OF THE PREFERRED EMBODIMENTS

The present invention provides a method of fracturing a subterranean formation whereby the production of fluids from a subterranean formation is increased. I carrying out the method of the invention, undesirable fines are removed from the proppant pack and/or fracture face of the formation which has been fractured.

One embodiment of the method comprises contacting the formation with a nonviscous aqueous fluid containing hydrogen ions at sufficient pressure to create a fracture in the formation and to leak off in the formation matrix, next a viscous aqueous fluid containing a gelling agent and fluoride ions is introduced into the formation at a pressure sufficient to extend the fracture, and subsequently the formation is contacted with alternate slugs of a viscous aqueous fluid containing a gelling agent and a proppant to extend the fracture and to prop the fracture open after the treating pressure on the formation has been reduced. The first slug comprises a viscous aqueous fluid containing hydrogen ions, a gelling agent, and a propping agent and the second slug comprises a viscous aqueous fluid containing fluoride ions, a gelling agent, and a propping agent. The introduction of the alternate slugs into the subterranean formation may be repeated as many times as is necessary to satisfactorily treat the formation for the desired fracture flow capacity.

In a second embodiment of the invention, a nonviscous aqueous fluid containing fluoride ions is introduced into the subterranean formations at sufficient pressure to initiate a fracture in the formation and is allowed to leak off into the formation matrix. Next, a viscous aqueous fluid containing a gelling agent and hydrogen ions is introduced into the formation at sufficient pressure to extend the fracture, and finally a viscous aqueous fluid containing a gelling agent, hydrogen ions, and a propping agent is introduced into the formation to extend the fracture and to prop the fracture open after the treating pressure on the formation is removed. The fluid containing fluoride ions is allowed to flow from the formation matrix into the fracture whereby the fluoride ions mix with the hydrogen ions to form hydrofluoric acid.

The use of the method of the present invention results in a formation which has increased permeability without undesirable fines in the proppant pack or fracture face.

The chemical source of hydrogen ions can be any aqueous acidic solution containing in the range from about 0.2 to about 5, preferably 0.9 to 3.0 and still more preferably from about 1.4 to about 2.2 equivalent weights of hydrogen ion per liter of solution. The preferred hydrogen ion sources are inorganic acids such as hydrochloric acid, nitric acid, sulfuric acid, and phosphoric acid, and organic acids such as acetic acid and formic acid with hydrochloric acid being most preferred source of hydrogen ions.

Table I, below, provides the approximate relationship between equivalent weights of hydrogen ion per liter of solution (normality, N) and hydrochloric acid concentration in percent by weight of solution.

TABLE I

| N | HCl Concentration % by Weight |
|---|---|
| 0.2 | 0.7 |
| 0.9 | 3.2 |
| 1.4 | 5.0 |
| 2.2 | 7.7 |
| 3.0 | 10.4 |
| 5.0 | 16.8 |

The relationship between normality and weight percent of other hydrogen ion sources can be calculated by methods known in the art.

The use of acids having a concentration greater than about 5 normal is not recommended because of the adverse effect such acids have on clay. Such highly concentrated acids could be used so long as contact with subsequently introduced fluoride is to be reasonably expected, for while such acids tend to flocculate clay, subsequently introduced fluoride would result in dissolution of the clay. However, it is certainly possible that all clay-containing locations in a formation, particularly those at some distance from the point of chemical introduction, could be contacted by acid but not by fluoride. In those locations, acid having concentrations greater than 5.0N, would produce clay damage which could not be removed by the method of this invention due to the possible absence of fluoride ion contact.

In addition, the use of highly concentrated acid increases such problems as emulsion formation and corrosion of downhole pipe and hardware.

The lower limit of acid is more an economic limit than a physical limit. Acids having a concentration less than 0.2 normal, would provide hydrogen ions capable of dissolving clay. But large volumes of acid having such low concentrations would be required, thus creating transportation difficulties and presenting the various problems involved in long pumping times.

The source of fluoride ions can, theoretically, be any alkali metal or alkaline earth metal fluoride or mixtures thereof; in actual practice, however, the source of fluoride ions in the practice of this invention is restricted to ammonium fluoride and/or ammonium bifluoride for the following reasons. The reaction of an acid, such as hydrochloric acid, with an alkali metal fluoride, such as sodium fluoride, produces sodium chloride and hydrofluoric acid. The produced hydrofluoric acid then reacts with silica ($SiO_2$) to produce water and fluosilicic acid. The above reactions render the use of the alkali metal fluorides theoretically useful for practice of this invention. However, the formed fluosilicic acid reacts with salts such as potassium and sodium salts to form an insoluble alkali metal precipitate. The thus formed precipitate remains insoluble even in the presence of the acid of concentrations useful in the method of the invention. Thus, by the use of an alkali metal fluoride, clay can be dissolved, but an insoluble precipitate can be formed to take its place.

It has been observed that the ammonium ion will not produce insoluble precipitates in the presence of fluosilicic acid.

The alkali earth metal fluorides, such as calcium fluoride, are also theoretical sources of fluoride ion. However, alkali earth metal fluorides themselves are insoluble except in the presence of highly concentrated acid. In view of the discussions given above with respect to the undesirable presence of acids having high concentrations, the use of alkali earth metal fluorides as a source of fluoride ion is not desirable.

The formation of insoluble precipitates in the presence of the ammonium ion in the practice of this invention has not been observed.

A sandstone formation contains calcareous constituents, which can include alkaline earth metals, such as calcium and magnesium. Water containing alkali metal salts such as sodium chloride and/or potassium chloride can also be present in sandstone formations. Thus, in view of the above discussion, there is a possibility of forming undesirable secondary precipitates while carrying out the method of the present invention. Accordingly, steps are preferably taken to isolate the potential precipitate-forming constituents from the fluoride ion-containing chemical sources. Thus, a preflush material can be utilized to form a barrier between the alkali metal-containing water and the fluoride-containing chemical source. Such a barrier can be any fluid which will not form undesirable secondary precipitates. Examples of suitable fluids are an ammonium chloride solution, organic acids such as acetic acid and formic acid, low concentrations of inorganic acids, and aromatic hydrocarbons. In those situations where the sandstone contains calcareous constituents, the preflush can be hydrochloric acid which would dissolve the alkaline earth metal components of the calcareous materials and remove them from the portion of the formation to be treated by the method of the present invention prior to the introduction of the fluoride-containing chemicals. When the barriers have been introduced, the actual introduction of the hydrogen ion sources and fluoride ion sources can be started.

The concentration of fluoride ions useful herein is substantially the same as given above for the concentration of hydrogen ion. Thus, ammonium fluoride and/or ammonium bifluoride containing in the range of from about 0.2 to about 5, preferably 0.3 to 3, and still more preferably from about 0.7 to about 2.0, equivalent weights of fluoride ion per liter of solution is useful. The preferred fluoride ion source is an aqueous solution of ammonium fluoride having a concentration of about 2.8 percent by weight of solution (0.76N).

In carrying out the method of the present invention, it is preferred that the fluoride ion be stoichiometrically equivalent to the hydrogen ion concentration or slightly less. It is believed that an excess of fluoride ions would tend to produce the insoluble precipitates, referred to previously, due to the probable presence of alkali metals and alkaline earth metals in the sandstone formations.

In carrying out the method of the invention, it is desired that the clay materials dissolve but the sand materials not dissolve. Thus, it is preferable that the chemical source of fluoride ions be introduced into the formation at a neutral pH or preferably at a slightly basic value, 7 to 8, to assure the absence of hydrogen ions, which could result in the premature formation of hydrofluoric acid.

The aqueous fluids containing the hydrogen ions preferably contain an inhibitor to prevent or reduce corrosion attack on metals. A variety of such inhibitors are known in the art and the selection of the inhibitor will depend on the circumstances of the treatment. A small, but effective amount of the inhibitors can be employed which generally ranges from about 0.1% to about 1.5% by volume of the fluid containing the hydrogen ions.

In preparing the viscous fluids used to carry out the method of the invention, a gelling or thickening agent is incorporated into the fluid. Generally, any conventional gelling or thickening agent may be employed in accordance with the present invention. Examples of suitable gelling or thickening agents are galactomannes such as guar gum, guar karaya gum, tragacanth, gum ghatti, gum acacia, gum konjakshariz, lucas, psyllium, tamarind, gum tara, carrageenin, gum kauri, modified guars such as hydroxypropylguar, hydroxyethylguar, carboxymethylhydroxyethylguar, carboxymethylhydroxypropylguar, cellulose ethers such as carboxyethylcellulose, carboxymethylcellulose, carboxymethylhydroxyethylcellulose, hydroxyethylcellulose, hydroxypropylcellulose, methylhydroxypropylcellulose, methylcellulose, ethylcellulose, propylcellulose, hydroxypropylmethylcellulose, polyacrylamides, and polyacrylates.

Furthermore, the gelling or thickening agents can be crosslinked using crosslinking agents well known in the art.

A particularly preferred gelling agent for use in the viscous fluid containing hydrogen ions is selected from the group consisting of carboxymethylhydroxyethylcellulose having a DS of about 0.25 to about 0.6 and a MS of about 1.0 to about 3.0, carboxymethylhydroxypropylguar having a DS of 0.5 to about 0.2 and a MS of 0.1 to about 0.5 and mixtures thereof. These gelling agents when utilized in the fluids containing hydrogen ions can be crosslinked with zirconium metal salts or zirconium metal chelates. The gelling agent and zirconium crosslinking agents are disclosed in U.S. Pat. No. 4,324,668, which is assigned to the assignee of the present invention and is herein incorporated by reference.

The amount of gelling agent used in the viscous fluid will vary widely depending upon the properties desired in the fluid used to carry out the method of the invention. In general, the amount of gelling agent used will vary but will generally be in the range of from about 0.1 to about 1 percent by weight of aqueous fluid. There is, however, really no limit on the amount of gelling agent which can be used as long as the fluid can be pumped in accordance with the method of the invention.

In carrying out one embodiment of the present invention, an aqueous fluid containing fluoride ions, at preferably a slightly basic pH, is pumped into the formation at sufficient pressure to initiate a fracture in the formation and the fluid is allowed to leak off into the formation matrix. Next, an aqueous viscous fluid that comprises a gelling agent and hydrogen ions is introduced into the formation at sufficient pressure to extend the fracture and finally a viscous aqueous fluid comprising a gelling agent, hydrogen ions, and a propping agent is introduced into the formation to extend the fracture and to prop the fracture open after the treating pressure on the formation is reduced. The aqueous fluid containing the fluoride ions is then allowed to flow from the formation matrix into the fracture. The fluids mix to form hydrofluoric acid and the hydrofluoric acid then dissolves the clays which are present either on the fracture face or within the proppant bed.

In another embodiment of the invention, a nonviscous aqueous fluid containing hydrogen ions is introduced into the formation at sufficient pressure to initiate a fracture in the formation and to leak off into the formation matrix, and subsequently a viscous fluid comprising fluoride ions and a gelling agent is introduced into the fracture of the formation at a pressure sufficient to extend the fracture in the formation. Finally, a slug of a viscous fluid containing hydrogen ions, a gelling agent, and a proppant is introduced into the formation followed by the introduction of another slug of a viscous fluid containing a gelling agent, fluoride ions, and a proppant into the formation. Upon reduction of viscosity, which occurs, for instance, through the breaking of the viscous fluids contained in the fracture of the formation, the hydrogen and fluoride ions mix whereby hydrofluoric acid is generated which, in turn, removes fines located either on the fracture face or within the proppant bed.

Generally, agents used to reduce the viscosity of the viscous fluids used to carry out the method of the present invention are not required because of the low pH. If the formation contains significant quantities of carbonates, the acid will spend and the pH will rise. Therefore, the use of an agent in that instance to break the viscosity is usually recommended. These agents are well known in the art.

Conventional propping agents can be employed to carry out the present invention. Examples of suitable propping agents include quartz sand grains, tempered glass beads, walnut shells, resin coated sand, sintered bauxite, and other similar materials. Propping agents generally are used in concentrations in the range of from about 1 to about 10 pounds per gallon of aqueous fluid; however, higher or lower concentrations may be used as required. The particle size of the propping agent employed is a function of the nature of the formation to be fractured, the pressure required to produce the fracture, the pumping fluid flow rates available, as well as other known factors. However, particle sizes in the range of from about 200 to about 2 mesh in the U.S. Sieve Series scale may be employed in carrying out the present invention.

Preflush and overflush chemicals can be used in the present invention. These chemicals are well known in the art and include for example an aqueous composition containing ammonium chloride or acids such as hydrochloric acid, acetic acid, and formic acid, and aromatic and aliphatic hydrocarbons such as crude oil, kerosene, diesel oil, xylene, and the like.

The following example will serve to more comprehensively illustrate the principles of the invention, but is not intended to limit the bounds of the invention.

EXAMPLE

A test was carried out on a well in the Booch Sand formation which was located in Okmulgee County, Oklahoma. Prior to the treatment, the well had a production rate of 0.0 barrels of oil per day (BOPD), a production rate of 0.0 standard cubic feet of gas per day (SCFGPD) and a production rate of 0.0 barrels of water per day (BWPD).

The treatment was carried out by pumping a first aqueous fluid, herein referred to as a prepad, into the well at sufficient pressure to fracture the formation and to leak off into the formation matrix. The first aqueous fluid had a volume of 2,000 gallons and contained 400 pounds of ammonium bifluoride, 90 gallons of a 30 percent by weight ammonium hydroxide, and 666 pounds of ammonium chloride.

Next, a gelled aqueous fluid, herein referred to as a pad, with a total volume of 2,000 gallons was pumped into the formation. The gelled aqueous fluid contained 50 pounds of carboxymethylhydroxyethyl cellulose and was crosslinked with approximately 2.8 pounds of zirconium oxychloride. Twenty-eight percent by weight of hydrochloric acid was injected into the discharge side of the pump at a rate such that the gelled aqueous fluid contained 5 percent by weight hydrochloric acid.

After the 2,000 gallon gelled aqueous fluid had been pumped into the well, a series of fluids containing the same ingredients and concentrations as the pad were pumped into the well. These fluids contained sand as a propping agent. The volumes, sand concentrations, and type sand of these fluids are described in (a) through (d):

(a) 2,000 gallons of fluid containing 1 lb/gal of 20/40 sand,
(b) 2,000 gallons of fluid containing 2 lb/gal of 20/40 sand,
(c) 2,000 gallons of fluid containing 3 lb/gal of 20/40 sand,
(d) 2,000 gallons of fluid containing 4 lb/gal of 10/20 sand.

The fluid containing the propping agent was then displaced by pumping 750 gallons of a 2 percent by weight aqueous potassium chloride fluid. The well was shut in for a period of about 24 hours.

Upon return of the production of the well, the production rate was 3.5 BOPD, 0.0 SCFGPD, and 22.0 BWPD. Sixty days after the treatment, the production rate of the well was 2.0 BOPD, 0.0 SCFGPD, and 13 BWPD.

This invention is not limited to the above-described specific embodiments thereof; it must be understood, therefore, that the detail involved in the descriptions of the specific embodiments is presented for the purpose of illustration only, and reasonable variations and modifications, which will be apparent to those skilled in the art, can be made in this invention without departing from the spirit and scope thereof.

What is claimed is:

1. A method of increasing the production of fluids from a subterranean formation containing clay comprising:
   (a) contacting said formation at sufficient pressure to initiate a fracture in said formation with an aqueous fluid comprising fluoride ions and allowing said fluid to leak off into the formation matrix wherein said fluoride ions are selected from the group consisting of ammonium fluoride, ammonium bifluoride, and mixtures thereof;
   (b) contacting said formation at sufficient pressure to extend said fracture with a first aqueous viscous fluid comprising a gelling agent and hydrogen ions;
   (c) contacting said formation at a pressure sufficient to maintain said fracture with a second viscous fluid comprising a gelling agent, hydrogen ions, and a propping agent; and,
   (d) reducing the pressure on the formation to allow the aqueous fluid of step (a) to flow from the formation matrix into the fracture to form hydrofluoric acid whereby said hydrofluoric acid removes fines dispersed in the fracture face or the propping agent.

2. The method of claim 1 wherein said fluoride ions of step (a) have a fluoride ion concentration in the range of from about 0.2N to about 5.0N.

3. The method of claim 2 wherein the pH of said fluid of step (a) is adjusted with ammonium hydroxide to a value of at least about 7.

4. The method of claim 3 wherein the first and second viscous fluids have a hydrogen ion concentration in the range of from about 0.2N to about 5.0N.

5. The method of claim 4 wherein said gelling agent is selected from the group consisting of guar gum, guar karaya gum, tragacanth, gum ghatti, gum acacia, gum konjak shariz, lucas, psyllium, tamarind, gum tara, carrageenin, gum kauri, modified guars such as hydroxypropylguar, hydroxyethylguar, carboxymethylhydroxyethylguar, carboxymethylhydroxypropylguar, cellulose ethers such as carboxyethylcellulose, carboxymethylcellulose, carboxymethylhydroxyethylcellulose, hydroxyethylcellulose, hydroxypropylcellulose, methylhydroxypropylcellulose, methylcellulose, ethylcellulose, propylcellulose, hydroxypropylmethylcellulose, polyacrylamides, polyacrylates, and mixtures thereof.

6. The method recited in claim 5 wherein said gelling agent is selected from the group consisting of carboxymethylhydroxyethylcellulose having a DS of about 0.25 to about 0.6 and a MS of about 1.0 to about 3.0, carboxymethylhydroxypropylguar having a DS of 0.5 to about 0.2 and a MS of 0.1 to about 0.5, and mixtures thereof.

7. The method recited in claim 6 wherein the gelling agent is crosslinked with a zirconium metal selected from the group consisting of zirconium metal salts, zirconium metal chelates, and mixtures thereof.

8. The method recited in claim 4 wherein the acid source is selected from the group consisting of hydrochloric acid, nitric acid, sulfuric acid, phosphoric acid, acetic acid, formic acid, and mixtures thereof.

9. A method of fracturing a subterranean formation containing clay comprising:
   (a) contacting said formation at a pressure sufficient to initiate a fracture in said formation with a non-viscous aqueous fluid containing hydrogen ions and allowing the fluid to leak off into the formation matrix;
   (b) contacting said formation at sufficient pressure to extend said fracture with a first viscous fluid comprising a gelling agent and fluoride ions said fluoride ions being selected from the group consisting of ammonium fluoride, ammonium bifluoride, and mixtures thereof;
   (c) contacting said formation at a pressure sufficient to maintain said fracture with a second viscous fluid comprising a gelling agent, hydrogen ions, a propping agent;
   (d) contacting said formation at a pressure sufficient to maintain said fracture with a third viscous fluid comprising a gelling agent, fluoride ions, and a propping agent said fluoride ions being selected from the group consisting of ammonium fluoride, ammonium bifluoride, and mixtures thereof; and,
   (e) reducing the viscosity of said viscous fluids whereby hydrogen and fluoride ions mix to form hydrofluoric acid and fines are removed from the fracture face or the propping agent.

10. The method of claim 9 wherein said fluoride ions of step (b) and (d) have a fluoride ion concentration in the range of from about 0.2N to about 5.0N.

11. The method of claim 10 wherein the pH of said fluid of step (b) is adjusted with ammonium hydroxide to a value in the range of from about 7 to about 8.

12. The method of claim 11 wherein said aqueous fluid of step (a) has a hydrogen ion concentration in the range of from about 0.2N to about 5.0N.

13. The method of claim 9 wherein said gelling agent is selected from the group consisting of guar gum, guar karaya gum, tragacanth, gum ghatti, gum acacia, gum konjak shariz, lucas, psyllium, tamarind, gum tara, carrageenin, gum kauri, modified guars such as hydroxypropylguar, hydroxyethylguar, carboxymethylhydroxyethylguar, carboxymethylhydroxypropylguar, cellulose ethers such as carboxyethylcellulose, carboxymethylcellulose, carboxymethylhydroxyethylcellulose, hydroxyethylcellulose, hydroxypropylcellulose, methylhydroxypropylcellulose, methylcellulose, ethylcellulose, propylcellulose, hydroxypropylmethylcellulose, polyacrylamides, polyacrylates, and mixtures thereof.

14. The method recited in claim 9 wherein said gelling agent is selected from the group consisting of carboxymethylhydroxyethylcellulose having a DS of about 0.25 to about 0.6 and a MS of about 1.0 to about 3.0, carboxymethylhydroxypropylguar having a DS of 0.5 to about 0.2 and a MS of 0.1 to about 0.5, and mixtures thereof.

15. The method recited in claim 14 wherein the gelling agent of steps (a) and (c) is crosslinked with a zirconium metal selected from the group consisting of zirconium metal salts, zirconium metal chelates, and mixtures thereof.

16. The method recited in claim 15 wherein the hydrogen ion source is selected from the group consisting of hydrochloric acid, nitric acid, sulfuric acid, phosphoric acid, acetic acid, formic acid, and mixtures thereof.

17. The method recited in claim 9 wherein said formation is contacted with preflush fluid prior to step (a).

18. The method recited in claim 9 wherein steps (c) and (d) are repeated at least once.

19. The method recited in claim 17 where said formation is contacted after step (d) with an aqueous composition comprising ammonium chloride.

20. A method of fracturing a subterranean formation containing clay whereby the permeability of said fracture is increased comprising:
   (a) contacting said formation at a pressure sufficient to initiate a fracture in said formation with an aqueous composition having a pH in the range of from about 7 to about 8 and comprising ammonium fluoride and ammonium bifluoride and allowing said composition to leak off into the formation matrix;
   (b) contacting said formation at sufficient pressure to extend said fracture with an aqueous viscous composition comprising 5 percent by weight hydrochloric acid and a gelling agent comprising carboxymethylhydroxyethylcellulose crosslinked with zirconium oxychloride;
   (c) contacting said formation with an aqueous viscous composition comprising 5 percent by weight hydrochloric acid, a gelling agent comprising carboxymethylhydroxyethylcellulose crosslinked with zirconium oxychloride and a propping agent;
   (d) contacting said formation with an aqueous composition comprising ammonium chloride; and,
   (e) reducing the pressure on the formation to allow the aqueous composition of step (a) to flow from the formation matrix into the fracture to form hydrofluoric acid whereby said hydrofluoric acid removes fines from the fracture face or the propping agent.

* * * * *